Patented May 5, 1931

1,804,157

UNITED STATES PATENT OFFICE

ROBERT F. ELDER, OF PORTLAND, MAINE, AND ROGER B. HILL, OF BERLIN, NEW HAMPSHIRE, ASSIGNORS TO BROWN COMPANY, OF BERLIN, NEW HAMPSHIRE, A CORPORATION OF MAINE

PROCESSING OF LATEX

No Drawing. Application filed August 5, 1929. Serial No. 383,771.

Latex, as derived from nature, consists of an aqueous dispersion of rubber in an aqueous medium usually containing about 5% to 8% of non-rubber solids, such as proteins, resins, sugars, mineral salts, etc., in addition to the rubber hydrocarbon. The protein constituent is considered to be the natural protective colloid of the dispersion, enveloping the rubber particles and preventing coagulation. Latex is, however, subject to putrefaction and coagulation upon standing exposed to the atmosphere, probably as a result of decomposition and rupture of the envelopes on the rubber particles, so that it has become the practice to add stabilizing agents (e. g., alkalies or soaps) to the latex to prevent spoiling of the latex during shipment and storage. The latex of commerce (e. g., ammonia-preserved latex) finds diverse fields of application, for instance, in the coating or impregnation of fibrous foundations to impart such properties as waterproofness and strength thereto. Inasmuch as natural latex has a solids content of only about 32% to 35%, unless its concentration is effected at the plantation, considerable excess water is handled along with non-rubber solids or impurities which sometimes impart undesirable characteristics to the goods in which the latex is used. Various processes of concentrating latex have been proposed and used, one being to add so-called creaming agents to the latex, which cause a separation of the latex into a concentrated rubber-containing layer above an aqueous layer containing most of the non-rubber solids, whereupon the concentrated rubber-containing layer in uncoagulated condition may be separated or recovered from the aqueous layer. This process is therefore advantageous, in that it effects both a concentration and purification of the latex.

When latex in natural or concentrated condition is, for instance, used for coating or impregnation purposes and the latex-treated body is then dried, the rubber is coagulated in a continuous, coherent condition. It is frequently desired that the rubber be in vulcanized condition, as vulcanized rubber has higher tensile strength and is free from the tacky feel sometimes possessed by unvulcanized rubber. One process of producing a vulcanized rubber coagulum involves the addition of vulcanizing agents to the latex and heating to effect vulcanization but without causing coagulation, so that when the vulcanized latex is used in the treatment of a body and the body is then dried, the rubber is coagulated in a vulcanized condition, thereby avoiding the step of heating the body to effect vulcanization of the rubber associated therewith.

When latex is vulcanized and creaming agents are then added thereto, it is found that creaming takes place very slowly and incompletely, as compared with the creaming effected in the case of natural latex. Evidently the addition of materials such as sulphur, zinc oxide, and accelerators, followed by heating, modifies the rubber or non-rubber constituents of the latex to such an extent that creaming is retarded. For instance, when latex is treated with sulphur, zinc oxide, and an accelerator of vulcanization, and the mixture is then heated to about 75° C. and maintained at this temperature for about thirty minutes, the addition of a creaming agent thereto effects a markedly slower and less complete creaming action than takes place in the case of an untreated latex.

We have found that if creaming agents, such as gums or pectin-containing gels, and vulcanizing agents are uniformly admixed with latex, and the mixture is then heated but substantially without stirring, good creaming is effected during the period of vulcanization and after the vulcanized mixture is allowed to stand. It is highly important that practically no stirring of the mixture be effected after substantial vulcanization has been effected, as little creaming will take place if this precaution is not heeded.

While we have no explanation, based on facts, for the results which we secure, it appears that, once creaming has been initiated, the creaming agents continue to be effective even in the presence of vulcanizing agents and at vulcanizing temperatures, provided, however, no stirring of the mixture takes place after substantial vulcanization has been effected and after vulcanization has been completed. Evidently, the creaming agents impart an initial tendency for the rubber particles to float to and stay at the surface, and this tendency persists during and after vulcanization so long as the mixture is maintained in a substantially quiescent state after the initial stages of vulcanization, but if the mixture is disturbed, as by stirring, this tendency is destroyed. Whether or not our picture is correct, it is a fact that we are enabled to effect by one operation both a concentration and vulcanization of latex.

A better understanding of the present invention may be had from a specific example of procedure such as the following. An ammonia-preserved latex may be treated with about 10% by volume of a creaming agent, in the form of a 2% solution, various creaming agents such as plant saps, fruit juices, or gum tragacanth being suitable for this purpose. This may be immediately followed by the addition of vulcanizing agents, for instance, 2% sulphur, based on the weight of latex solids, together with about 1% zinc oxide and about 0.5% of an accelerator such as piperidene pentamethylene dithiocarbamate. The latex may be stirred to effect a uniform distribution of the added materials therethrough, whereupon the latex may be heated to about 75° C. and this temperature maintained for about two and a half hours, stirring being effected only during the first half-hour of the vulcanizing period, if at all, as during this time only a minor part of the vulcanization is effected. After vulcanization, it will be found that the volumetric ratio of "cream" or latex concentrate and serum will be about 2:3, the solids content of the cream being about 47.0%, and that of the serum about 5.2. The vulcanized latex concentrate may be removed or recovered from the serum, preferably after allowing the mixture to stand for about twenty-four hours or longer, to ensure maximum creaming or concentration, and used for the desired purposes. When films were prepared therefrom and tested, they showed a tensile strength of 3280 lbs./sq. in., and 950% stretch, as compared with a tensile strength of only about 500 lbs./sq. in. and a stretch of 750% shown by films prepared from the latex used as a raw material.

The example hereinbefore given is subject to variation. For instance, after the addition of the creaming agents, the latex may be allowed to stand until substantial creaming has taken place, whereupon the vulcanizing agents may be stirred thereinto and the mixture heated to vulcaniizng temperature, say, 75° C., and this temperature maintained for about two and a half hours, stirring of the mixture being effected only during the first half hour of the vulcanizing period. Such a variation, however, not only involves a longer period of processing, but gives results not quite as good as those obtained by the procedure cited in the example.

We claim:

1. A process which comprises adding a creaming agent to latex, vulcanizing such latex while creaming is taking place, and recovering the vulcanized, creamed portion.

2. A process which comprises adding creaming and vulcanizing agents to latex, heating such latex to effect vulcanization while creaming is taking place, and recovering the vulcanized, creamed portion.

3. A process which comprises adding a creaming agent to latex, vulcanizing the latex during the creaming period and while maintaining it in substantially quiescent state after the initial stages of vulcanization, and recovering the vulcanized, creamed portion of the latex.

4. A process which comprises adding creaming and vulcanizing agents to latex, and heating the latex to effect vulcanization during the creaming period and while maintaining such latex in substantially quiescent state after the initial stages of vulcanization, and recovering the vulcanized, creamed portion of the latex.

5. A process which comprises stirring creaming and vulcanizing agents into rubber latex, heating the latex to effect vulcanization during the creaming period and while stirring only during the initial part of the vulcanizing period, and recovering the vulcanized, creamed portion of the latex.

6. A process which comprises adding creaming and vulcanizing agents to latex, heating the latex to effect vulcanization while creaming is taking place, allowing the vulcanized latex to stand until substantially maximum creaming has been effected, and recovering the vulcanized, creamed portion of the latex.

In testimony whereof we have affixed our signatures.

ROBERT F. ELDER.
ROGER B. HILL.